United States Patent Office 2,741,616
Patented Apr. 10, 1956

2,741,616

N-SUBSTITUTED DESOXYNORMORPHINE COMPOUNDS

Robert L. Clark, Woodbridge, and Karl Pfister III, Westfield, N. J., assignors to Merck & Co., Inc., Rahway, N. J., a corporation of New Jersey No Drawing. Application November 22, 1952, Serial No. 322,148

6 Claims. (Cl. 260—285)

This invention is concerned generally with novel derivatives of morphine and with processes for preparing these morphine derivatives. More particularly, it relates to novel N-substituted desoxynormorphine compounds having attached to the nitrogen atom the terminal carbon of a straight aliphatic chain consisting of three carbon atoms, to lower alkanoyl esters of these N-substituted desoxynormorphine compounds, to acid salts thereof, and to novel processes for preparing these compounds starting with the corresponding N-substituted desoxynorcodeine compound. These N-substituted desoxynormorphine compounds, their esters, and salts thereof, are active as morphine antagonists.

The N-substituted desoxynormorphine compounds, their esters and acid salts thereof, subject of the present invention, may be chemically represented by the following structural formulae:

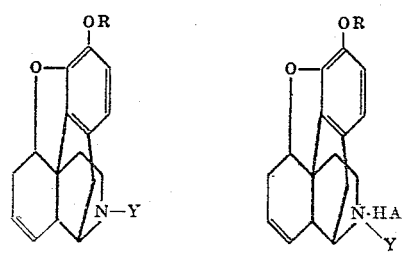

wherein R is hydrogen or a lower alkanoyl radical, Y is an aliphatic radical containing a straight chain consisting of three carbon atoms the terminal carbon of which is attached to the nitrogen atom, and HA is an acid.

The chemical relationship of these N-substituted desoxynormorphine compounds, and their esters, to morphine is clear from a comparison of the foregoing formulae with the formula for morphine which is as follows:

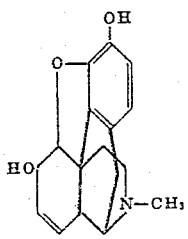

Whereas the alkaloid morphine is a potent analgesic, we have found that N-substituted desoxynormorphine compounds having attached to the nitrogen atom the terminal carbon of a straight aliphatic chain consisting of three carbon atoms, and, in particular, N-n-propyl-desoxynormorphine, N-isobutyldesoxynormorphine, N-allyldesoxynormorphine, N-methallyldesoxynormorphine, the lower alkanoyl esters of these N-substituted desoxynormorphine compounds, and acid salts thereof, are strong morphine antagonists and prevent or abolish the analgestic action of morphine when utilized in conjunction with that drug. This antagonistic action possessed by the subject compounds is particularly surprising in view of the fact that other N-alkyldesoxynormorphine compounds such as N-methyldesoxynormorphine (i. e., desoxymorphine), N-n-butyldesoxynormorphine, N-amyldesoxynormorphine and N-hexyldesoxynormorphine, exhibit no appreciable morphine antagonistic activity.

The N-substituted desoxynormorphine compounds having attached to the nitrogen atom the terminal carbon of a straight aliphatic chain consisting of three carbon atoms, the lower alkanoyl esters of these desoxynormorphine compounds, and acid salts thereof, can be prepared by reactions which may be chemically represented as follows:

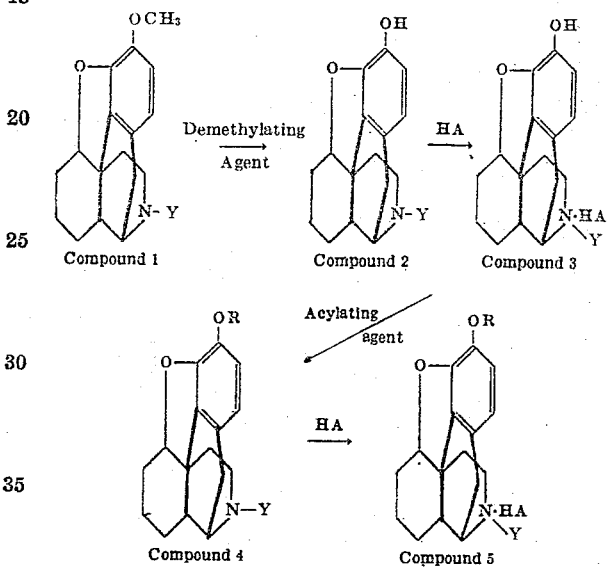

wherein R is a lower alkanoyl radical, Y is an aliphatic radical containing a straight chain consisting of three carbon atoms, a terminal carbon of which is attached to the nitrogen atom, and HA is an acid.

The reactions indicated hereinabove are carried out as follows: an N-substituted desoxynorcodeine compound having attached to the nitrogen atom a terminal carbon atom of a straight aliphatic chain consisting of three carbon atoms (Compound 1) is reacted with demethylating agent, thereby forming the corresponding N-substituted desoxynormorphine compound (Compound 2); the latter compound is reacted with an acid to produce the corresponding salt of said N-substituted desoxynormorphine compound (Compound 3); alternatively, the N-substituted desoxynormorphine compound is reacted with a lower alkanonic anhydride thereby producing the corresponding 3-alkanoyl-N-substituted desoxynormorphine compound wherein the N-substituent is an aliphatic radical containing a straight chain consisting of three carbon atoms a terminal carbon of which is attached to the nitrogen atom (Compound 4), which is converted by reaction with an acid to the corresponding acid salt of the 3-alkanoyl desoxynormorphine compound (Compound 5).

The desoxynorcodeine, which is used as a starting material in our novel process, is a new compound which can be prepared by reacting desoxycodeine with cyanogen bromide in chloroform solution to form N-cyanodesoxynorcodeine; heating said N-cyanodesoxynorcodeine with aqueous hydrochloric acid, thereby hydrolyzing the nitrile substituent and decarboxylating the resulting N-carboxy-desoxynorcodeine to produce desoxynorcodeine and reacting the latter compound in ethanol solution with an aliphatic halide in contact with sodium bicarbonate thereby forming the corresponding N-substituted desoxynorcodeine compound. The aliphatic halides which we use in the aforementioned reaction with desoxynorcodeine contain a straight aliphatic chain consisting of three carbon atoms the terminal carbon of which is attached to the halogen atom; this aliphatic chain may be unsubstituted or it may have a methyl grouping attached to the middle carbon. We prefer to employ, as the aliphatic halide an n-propyl halide such as n-propyl bromide, an isobutyl halide such as isobutyl bromide, an allyl halide such as allyl bromide, a methallyl halide such as methallyl bromide, and the like. In accordance with this procedure there are obtained N-substituted desoxynorcodeine compounds having attached to the nitrogen atom a terminal carbon of a straight aliphatic chain consisting of three carbon atoms which may have a methyl grouping attached to the middle carbon of said chain as, for example, N-n-propyldesoxynorcodeine, N-isobutyldesoxynorcodeine, N-allyldesoxynorcodeine and N-methallyldesoxynorcodeine.

In accordance with the present invention the N-substituted desoxynorcodeine compound having attached to the nitrogen atom a terminal carbon of a straight aliphatic chain consisting of three carbon atoms is reacted with a demethylating agent whereupon the 3-methyl ether substituent of the N-substituted desoxynorcodeine compound is converted to a phenolic hydroxyl grouping without substantially affecting other substituents in the molecule thereby forming the corresponding N-substituted desoxynormorphine compound. We ordinarily employ, as the demethylating agent the salt of a tertiary amine with a strong acid, as for example, the hydrohalide of a tertiary heterocyclic amine such as pyridine hydrochloride, pyridine hydrobromide, picoline hydrochloride, picoline hydrobromide, quinoline hydrochloride, quinoline hydrobromide, an alkali metal alkoxide such as sodium ethoxide, sodium methoxide, a hydrohalic acid, such as hydrobromic acid, hydroiodic acid, and the like. The demethylation reaction is ordinarily conducted when using a tertiary amine salt by heating the N-substituted desoxynorcodeine compound with the demethylating agent, at an elevated temperature above about 200° C. We prefer to employ pyridine hydrochloride as the demethylating agent and to carry out the reaction by heating the reactants together at a temperature within the range of about 215—225° C.; under these reaction conditions the demethylation is usually substantially complete after a heating period of approximately eighteen minutes. The reaction mixture is then cooled and diluted with water. The pH of the resulting aqueous solution is then adjusted to approximately 8 and the mildly alkaline aqueous solution extracted with a water-immiscible aqueous solvent such as ether. The solvent extract is then evaporated and the residual material is extracted with an aqueous alkaline metal hydroxide solution. The aqueous alkaline solution thus obtained is adjusted to a pH of about 8 and extracted with an organic solvent such as ether. Upon evaporation of the organic solvent there is obtained the N-substituted desoxynormorphine compound which can be purified if desired by recrystallization from an organic solvent such as ethyl acetate. In accordance with our novel demethylation procedure there are obtained N-substituted desoxynormorphine compounds having attached to the nitrogen atom a terminal carbon of a straight aliphatic chain consisting of three carbon atoms which may have a methyl grouping attached to the middle carbon atom of said chain, as, for example, N-n-propyldesoxynormorphine, N-isobutyldesoxynormorphine, N - allyldesoxynormorphine, and N-methallyldesoxynormorphine.

The N-substituted desoxynormorphine compound having attached to the nitrogen atom a terminal carbon of a straight aliphatic chain consisting of three carbon atoms is then reacted with a lower alkanoic anhydride such as acetic anhydride, propionic anhydride, and the like, thereby esterifying the hydroxyl radical in the 3-position of the molecule to form the corresponding 3-alkanoyl N-substituted desoxynormorphine compound having attached to the nitrogen atom the terminal carbon of a straight aliphatic chain consisting of three carbon atoms which may have a methyl grouping attached to the middle carbon atom of said chain as, for example, 3-acetyl-N-(n-propyl)-desoxynormorphine; 3-propionyl-N-(n-propyl)-desoxynormorphine; 3-butyryl-N-(n-propyl)-desoxynormorphine; 3-acetyl-N-isobutyldesoxynormorphine; 3-propionyl-N-isobutyldesoxynormorphine; 3-butyryl-N-isobutyldesoxynormorphine; 3 - acetyl - N - allyldesoxynormorphine; 3-propionyl-N-allyldesoxynormorphine; 3-butyryl-N-allyldesoxynormorphine; 3 - acetyl - N - methallyldesoxynormorphine; 3-propionyl-N-methallyldesoxynormorphine; 3-butyryl-N-methallyldesoxynormorphine, and the like.

The reaction between the alkanoic acid anhydride and the N-substituted desoxynormorphine compound is ordinarily conducted by heating a mixture of the reactants to a temperature of about 100° C. for a period of about two to three hours. The reaction mixture is then evaporated under reduced pressure, and the residual material is purified by recrystallization from a lower alkanol such as ethanol to give the 3-alkanoyl-N-substituted desoxynormorphine compound in substantially pure form.

The conversion of the N-substituted desoxynormorphine compounds, or their lower alkanoyl esters, the 3-alkanoyl-N-substituted desoxynormorphine compounds, to the corresponding acid salts is ordinarily conducted by reacting the N-substituted desoxynormorphine compound or the 3-alkanoyl-N-substituted desoxynormorphine compound, under substantially anhydrous conditions, with an acid, as for example, hydrogen chloride, hydrogen bromide, sulfuric acid, acetic acid, tartaric acid, citric acid, and the like. This salt-forming reaction is conveniently carried out by dissolving the N-substituted desoxynormorphine compound, or the 3-alkanoyl-N-substituted desoxynormorphine compound, in a hot lower alkanol, such as ethanol, methanol, propanol, and the like, and adding to the solution a slight excess of an alcoholic solution of the appropriate acid. Upon diluting the resulting alcoholic medium with an alcohol-miscible non-solvent for the product, such as diethyl ether, there crystallizes from the mixture (depending on whether the N-substituted desoxynormorphine, or its ester, is used as starting material) the acid salt of the N-substituted desoxynormorphine compound or the acid salt of the 3-alkanoyl-N-substituted desoxynormorphine, such as N-n-propyldesoxynormorphine hydrochloride, N-n-propyldesoxynormorphine hydrobromide, N-n-propyldesoxynormorphine sulfate, N-n-propyldesoxynormorphine acetate, N-n-propyldesoxynormorphine tartrate, N-isobutyl desoxynormorphine hydrochloride, N-isobutyldesoxynormorphine hydrobromide, N-isobutyldesoxynormorphine sulfate, N-isobutyldesoxynormorphine acetate, N-isobutyldesoxynormorphine tartrate, N-allyldesoxynormorphine hydrochloride, N-allyldesoxynormorphine hydrobromide, N-allyldesoxynormorphine sulfate, N-allyldesoxynormorphine acetate, N-allyldesoxynormorphine tartrate, N-methallyldesoxynormorphine hydrochloride, N-methallyldesoxynormorphine hydrobromide, N-methallyldesoxynormorphine sulfate, N-methallyldesoxynormorphine acetate, N-methallyldesoxynormorphine tartrate, 3-acetyl-N-(n-propyl)-desoxynormorphine hydrochloride, 3-acetyl-N-(n-propyl)-desoxynormorphine hydrobromide, 3-acetyl-N-(n-propyl)-desoxynormorphine sulfate, 3-acetyl-N-(n-propyl)-desoxynormorphine acetate, 3-acetyl-N-(n-propyl)-desoxynormorphine tartrate, 3-propionyl-N-(n-propyl)-desoxynormorphine hydrochloride, 3-propionyl-N-(n-propyl)-desoxynormorphine hydrobromide, 3 - propionyl - N - (n-propyl)-desoxynormorphine sulfate, 3-propionyl-N-(n-propyl)-desoxynormorphine acetate, 3-butyryl-N-(n-propyl)-desoxynormorphine hydrochloride, 3-butyryl-N-(n-propyl)-desoxynormorphine hydrobromide, 3-butyryl-N-(n-propyl)-desoxynormorphine sulfate, 3-butyryl-N-(n- propyl)-desoxynormorphine tartrate, 3-acetyl-N-isobutyldesoxynormorphine hydrochloride, 3-acetyl-N-isobutyldesoxynormorphine hydrobromide, 3-acetyl-N-isobutyldesoxynormorphine sulfate, 3-acetyl-N-isobutyldesoxynormorphine acetate, 3-acetyl-N-isobutyldesoxynormorphine tartrate, 3-propionyl-N-isobutyldesoxynormorphine hydrochloride, 3-propionyl-N-isobutyldesoxynormorphine hydrobromide, 3 - propionyl - N - isobutyldesoxynormorphine sulfate, 3-propionyl-N-isobutyldesoxynormorphine tartrate, 3-butyryl-N-isobutyldesoxynormorphine hydrochloride, 3-butyryl-N-isobutyldesoxynormorphine hydrobromide, 3-butyryl-N-isobutyldesoxynormorphine sulfate, 3-butyryl-N-isobutyldesoxynormorphine acetate, 3-acetyl-N-allyldesoxynormorphine hydrochloride, 3-acetyl-N-allyldesoxynormorphine hydrobromide, 3-acetyl-N-allyldesoxynormorphine sulfate, 3-acetyl-N-allyldesoxynormorphine acetate, 3-acetyl-N-allyldesoxynormorphine tartrate, 3-propionyl-N-allyldesoxynormorphine hydrochloride, 3-propionyl-N-allyldesoxynormorphine hydrobromide, 3-propionyl-N-allyldesoxynormorphine sulfate, 3-propionyl-N-allyldesoxynormorphine tartrate, 3-butyryl-N-allyl-desoxynormorphine hydrochloride, 3-butyryl-N-allyldesoxynormorphine hydrobromide, 3-butyryl-N-allyldesoxynormorphine sulfate, 3-butyryl-N-allyldesoxynormorphine acetate, 3-acetyl-N-methallyldesoxynormorphine hydrochloride, 3-acetyl-N-methallyldesoxynormorphine hydrobromide, 3-acetyl-N-methallyldesoxynormorphine sulfate, 3-acetyl-N-methallyldesoxynormorphine acetate, 3-acetyl-N-methallyldesoxynormorphine tartrate, 3-propionyl-N-methallyldesoxynormorphine hydrochloride, 3-propionyl-N-methallyldesoxynormorphine hydrobromide, 3-propionyl-N-methallyldesoxynormorphine sulfate, 3-propionyl-N-methallyldesoxynormorphine acetate, 3-butyryl-N-methallyldesoxynormorphine hydrochloride, 3-butyryl-N-methallyldesoxynormorphine hydrobromide, 3-butyryl-N - methallyldesoxynormorphine sulfate, 3 - butyryl - N-methallyldesoxynormorphine tartrate, and the like. The salt thus formed is recovered from the alcoholic slurry by filtration or centrifugation.

The following examples illustrate methods of carrying out the present invention, but it is to be understood that these examples are given for purposes of illustration and not of limitation.

EXAMPLE 1

*Preparation of N-n-propyldesoxynormorphine hydrochloride*

A mixture of 1.65 g. of N-n-propyldesoxynorcodeine and 5.5 g. of dry pyridine hydrochloride was heated at a temperature of about 215–225° C. for a period of approximately eighteen minutes. The reaction mixture was cooled and to the cooled mixture was added about 25 ml. of water. A solution was formed followed by the separation of the product as a white precipitate. The crude N - n - propyldesoxynormorphine hydrochloride was removed by filtration, and dried, M. P. 255–265° C. The product was recrystallized from water, melted at 270–271° C. $[\alpha]_D^{25} = -32.6°$ (c, 1.09 in absolute ethanol).

*Analysis.*—Calculated for $C_{19}H_{23}NO_2 \cdot HCl + 3.5\% H_2O$: C, 65.97; H, 7.37; $H_2O$, 3.5. Found: C, 66.10; H, 7.01; $H_2O$, 3.7.

The N-n-propyldesoxynorcodeine utilized as starting material in the foregoing process may be prepared in accordance with the following three-step procedure: (1) A solution of 19.0 g. of desoxycodeine in 45 ml. of dry chloroform is added, dropwise with stirring, over a one hour period, to a refluxing solution of 7.8 g. of cyanogen bromide in 25 ml. of dry chloroform. The resulting solution is heated under reflux for an additional period of five hours, and the reaction mixture is cooled and diluted with about 400 ml. of ether. A gummy precipitate of desoxycodeine methyl bromide separates and is removed by filtration. The filtrate is concentrated under reduced pressure to a small volume from which the product N-cyanodesoxynorcodeine crystallizes. Recrystallization from ethyl acetate yields substantially pure N-cyanodesoxynorcodeine having a melting point of 149–150° C.

(2) A mixture of 33 g. of N-cyanodesoxynorcodeine, 128 ml. of glacial acetic acid, 45 ml. of concentrated hydrochloric acid, and 900 ml. of distilled water is heated to a temperature of about 90° C. and maintained at that temperature for a period of about ninety hours. The resulting reaction solution is filtered through a mat of activated charcoal thereby decolorizing said solution. The light yellow filtrate is cooled and ammonium hydroxide is added to the cold solution until an oil is no longer precipitated. The resulting mixture is extracted with three portions of ether, the ether extracts are combined, and the resulting ether solution is dried over magnesium sulfate. The dry ether solution is evaporated under reduced pressure, and the residual crystalline material is recrystallized from ether to give substantially pure desoxynorcodeine having a melting point of 85–86° C.

(3) A mixture of 4 g. of desoxynorcodeine, 2.52 g. of n-propyl iodide, 1.78 g. of sodium bicarbonate and 50 ml. of absolute ethanol is heated under reflux, with stirring, for a period of approximately twenty-four hours. At the end of this period, some insoluble material is present and is removed by filtration. The filtered solution is evaporated to dryness under reduced pressure, the residual material is slurried with several portions of diethyl ether and filtered. The clear ether filtrate is concentrated in vacuo to yield an oil from which N-n-propyldesoxynorcodeine crystallizes slowly. The latter material can be purified, if desired, by dissolving the crystalline material in an ethanolic hydrogen bromide solution, and allowing the resulting alcoholic solution to stand whereupon a crystalline product precipitates. This crystalline material is recovered by filtration and recrystallizes from an ethanol-ether mixture to give N-n-propyldesoxynorcodeine hydrobromide having a melting point of 281–283° C.

EXAMPLE 2

*Preparation of N-allyldesoxynormorphine*

A mixture of 2 g. of N-allyldesoxynorcodeine and 6 g. of pyridine hydrochloride was heated at 210–225° C. for ten minutes, after which it was cooled and diluted with 20 ml. of water. Twenty milliliters of ether was added and the solution made slightly basic with ammonium hydroxide. The aqueous phase was extracted with five portions of ether. The combined ether extracts were washed with water, dried over magnesium sulfate and evaporated to dryness. The resulting oil was redissolved in ether and the product extracted into dilute alkali (approximately 0.5 N sodium hydroxide). The aqueous extract was acidified with hydrochloric acid, adjusted to about pH 8 with ammonium hydroxide, and extracted with four portions of ether. The combined ether extracts were evaporated to yield light tan crystalline N-allyldesoxynormorphine. Recrystallization from ethyl acetate resulted in a material melting at 174–175° C. $[\alpha]_D^{25} = -96°$ (c, 0.88 in ethanol).

*Analysis.*—Calculated for $C_{19}H_{21}NO_2$: C, 77.27; H, 7.17; N, 4.74. Found: C, 77.57; H, 7.46; N, 4.83.

The N-allyldesoxynorcodeine utilized as starting material in the foregoing process can be prepared in accordance with the following procedure: A mixture of one molecular equivalent of desoxynorcodeine (which can be prepared as set forth under the heading of Example 1 hereinabove), one molecular equivalent of allyl bromide, one and one-half molecular equivalent of sodium bicarbonate in absolute ethanol is heated under reflux, with stirring, for a period of about one to two days. At the end of this period, the ethanolic reaction mixture is cooled and filtered. The filtered alcoholic solution is evaporated to dryness under reduced pressure and the residual material is extracted with three portions of hot chloroform. The chloroform extracts are combined, and the resulting chloroform solution is evaporated to dryness to give N-allyldesoxynorcodeine.

Various changes and modifications may be made in carrying out the present invention without departing from the spirit and scope thereof. Insofar as these changes and modifications are within the purview of the annexed claims, they are to be considered as part of our invention.

We claim:

1. A compound selected from the group consisting of an N-substituted desoxynormorphine having attached to the nitrogen atom a radical selected from the group consisting of N-n-propyl, N-isobutyl, N-allyl and N-methallyl radicals, lower alkanoyl esters of said N-substituted desoxynormorphine compound, and acid addition salts thereof.

2. N-n-propyldesoxynormorphine.
3. N-n-propyldesoxynormorphine hydrochloride.
4. N-allyldesoxynormorphine.
5. N-allyldesoxynormorphine sulfate.
6. N-methallyldesoxynormorphine.

References Cited in the file of this patent

UNITED STATES PATENTS

| | | |
|---|---|---|
| 2,087,134 | Warnat | July 13, 1937 |
| 2,178,010 | Small | Oct. 31, 1939 |

OTHER REFERENCES

Small: J. Org. Chem., vol. 3, p. 214 (1938).